Nov. 26, 1963
M. R. HAVENS
3,112,041
COMPACT EQUIPMENT CARRIER
Filed May 19, 1961
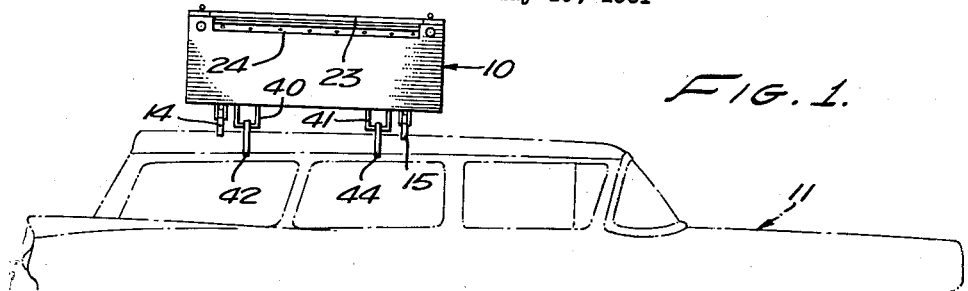
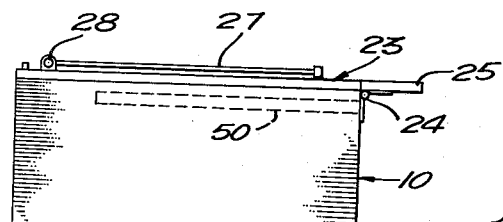
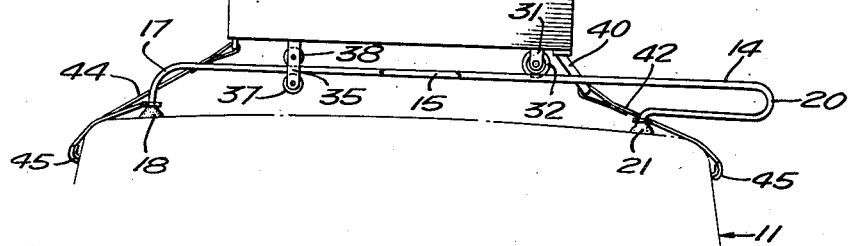
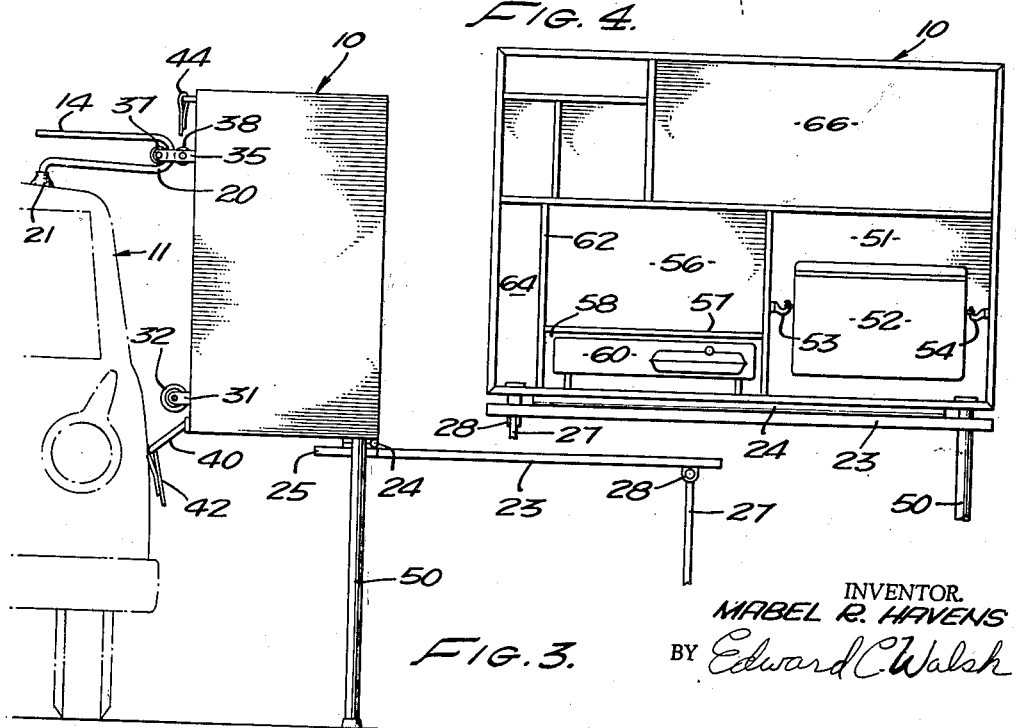
INVENTOR.
MABEL R. HAVENS
BY Edward C. Walsh
ATTORNEY

United States Patent Office 3,112,041
Patented Nov. 26, 1963

3,112,041
COMPACT EQUIPMENT CARRIER
Mabel R. Havens, % Veterans Administration Branch,
Los Angeles 25, Calif.
Filed May 19, 1961, Ser. No. 111,212
2 Claims. (Cl. 214—450)

This invention relates to a novel and improved compact equipment or apparatus carrier or transporter adapted for carrying equipment or apparatus on top of an automotive vehicle. The invention relates more particularly to a compact carrier for transporting camping equipment and the like although it is not limited thereto since certain principles of the invention may be utilized in other types of transporters.

A primary object of the invention is to provide a novel and improved means for transporting or carrying an equipment holder or container on top of an automotive vehicle while at the same time making it convenient and easy to move the carrier into and to hold it in a position wherein easy access may be had to the contents of the carrier and usage may be made of it while in that position.

An object of the invention is to provide a carrier which will offer most of the conveniences of a camping size house trailer without the inconvenience and necessity of towing a trailer behind the vehicle. The carrier of the invention may be carried on the top of a vehicle and when such a vehicle is a station wagon or a car that contains a bed, the user has the facilities for complete travel comfort without the burden of towing a trailer.

In a preferred form of the invention, the carrier is one provided with the necessary equipment and/or utensils necessary for traveling and/or camping, thus, leaving the interior of the vehicle unencumbered with such items and available for the transportion of luggage and/or passengers.

Another object of the invention is to provide a carrier as described having means whereby it may be conveniently moved laterally on rails on top of the vehicle and then tilted and held in an upright position for convenient utilization at a side of the vehicle.

Another object is to provide a carrier as in the foregoing, mounted on tracks or rails on top of the vehicle, the rails have laterally extending parts and the carrier having means providing holding engagement with the extending part of the rails whereby the carrier can be tilted into an upright position at the side of the vehicle and held there for utilization of the equipment carried therein.

Another object of the invention is to provide simplified means for securely holding the carrier during transportation and for supporting it in an upright position during usage.

Another object is to provide a carrier as in the foregoing, which is compartmentalized and arranged interiorly to provide for stowage of and transporting of camping equipment, traveling utensils and items and provisions.

Another object is to provide a carrier as in the foregoing, having a refrigerator unit in it which is swivel mounted so that it is upright in all positions of the carrier.

Another object is to provide a carrier as in the foregoing, having a hinged cover or door which is movable about its hinge and which has means to support it as a table.

Further objects and additional advantages will become apparent from the following detailed description, claims and annexed drawings wherein:

FIG. 1 is a side elevational partly schematic view of a preferred form of the invention;

FIG. 2 is an end view of the carrier mounted on a vehicle;

FIG. 3 is a view of the carrier in an upright, supported position at the side of the vehicle;

FIG. 4 is an interior view of a representative form of compartmentalization within the carrier.

Referring now more in detail to the figures of the drawings, FIG. 1 shows a carrier as designated generally at 10 mounted on the top of a vehicle which may be a station wagon as designated at 11. In the form of the invention shown, the carrier is in the form of a rectangular box or container and may be said to resemble a cupboard. FIGS. 1 and 2 show the manner in which the carrier is transported on the vehicle. A pair of rails or tracks are provided as designated at 14 and 15. These rails have a bend at one end as illustrated at 17 and are attached to rubber suction cups as shown at 18 which may be securely attached to the top of the vehicle. At the other end, the tracks or rails have hairpin bends as illustrated at 20 in FIG. 2. These bends extend outwardly laterally from the side of the vehicle, the purpose of which will be explained presently. At the ends of the return part of the bends, there are provided rubber suction cups as illustrated at 21 for securement to the top of the vehicle similarly to the suction cups 18. The rails, as described, might be tubular metal stock, for example, or also could be flat strip metal stock. The carrier has a hinged door or cover 23 which is hinged on a hinge 24. This cover has a part 25 extending beyond the edge of the carrier for a purpose which will be described presently. In the transporting position, the door or cover 23 is the top of the carrier. It has hingedly attached to it a pair of supporting legs such as illustrated at 27 pivoted or hinged as illustrated at 28. The purpose of these legs will be described presently.

In the transporting position of FIG. 2, the carrier is supported on the tracks 14 and 15 on rollers. The carrier has extending brackets as illustrated at 31 carrying flanged roller wheels as shown at 32 engageable with the rails 14 and 15. The flanges may be either on the inside or outside of the rails. The carrier has additional roller means adjacent the other end and at each side thereof cooperating with the rails 14 and 15. At each side near the other end, there are provided a pair of brackets as illustrated at 35; the brackets 35 straddle a rail such as the rail 14 and journalled on pivots or axles extending between the brackets are rollers 37 and 38, the roller 37 being below the rail and the roller 38 being above it. This arrangement is the same on both sides of the carrier with respect to each rail. At the end of the carrier there are provided extending handles as designated at 40 and 41 which are heavily covered or padded with rubber since these handles butt against the side of the vehicle as shown in FIG. 3 when it is in its upright position. In the transporting position, the carrier is securely held by means of straps as illustrated at 42 and 44. The straps 42 are attached to the handles 40 and have clips 45 whereby they may be attached to the rain gutters along the sides of the vehicle as shown. The straps 42 may, of course, have adjustment means so that they can be appropriately adjusted to provide the proper securement. The straps 44 are similarly attached and may be similarly adjustable.

FIG. 3 shows the position of the carrier when it has been unsecured, moved laterally on its tracks or rails, tilted and then held in its upright position for utilization of its contents. The carrier will traverse its rails and will glide outwardly or laterally with ease. This is done simply by unfastening the securing straps and grasping the handles 40 and pulling outwardly. As the carrier moves outwardly, the rollers 32 leave the rails; the other rollers remain in engagement with the rails and held to them. As the carrier is moved outwardly, it is tilted into the position shown in FIG. 3 with the rubber covered or padded handles 40 coming into engagement with the side of the vehicle as shown. The spaced rollers 37 and 38 allow the carrier to glide freely outwardly and they partly traverse the hairpin turns or bends 20 while still holding the carrier and keeping it upright as shown in FIG. 3. In this position, the top or cover 23 is rotated about its hinge 24 into a horizontal position in which it becomes a table with the legs 27 extended to provide support. The extending part 25 of the cover now extends underneath the carrier to provide support therefor. Numeral 50 designates a pair of additional supporting legs which telescope outwardly from the carrier 10 and may be latched by any suitable means in their telescoped position to provide support.

When the cover or door 23 is in the position of FIG. 3, the interior of the carrier is exposed for access to and utilization of the contents.

FIG. 4 shows the interior of the carrier or cupboard. Preferably, the interior is compartmentalized as shown by the various partitions in FIG. 4. A compartment 51 is provided having in it a refrigerator unit or ice chest 52 which is mounted on swivel hooks 53 and 54. These hooks engage with rings on the ends of the refrigerator unit 52 and have a swivel mounting inside of the compartment 51. The compartment 51 is large enough with respect to the unit 52 that when the carrier 10 is moved into its transport position as shown in FIG. 2, the unit 52 rotates on its swivel mountings and remains in an upright position. Also, the unit 52 may be easily lifted off its hooks, and removed and, if desired, placed on the table 23.

Numeral 56 designates another compartment having in it a relatively low shelf 57 providing a further compartment 58 which is of a size to snugly have fitted into it a camp stove as designated at 60. The camp stove may be readily removed for usage and is otherwise snugly transported in its compartment without freedom for it to move around and possibly be damaged.

Vertical partition 62 provides a compartment 64 suitably dimensioned for carrying a wash basin, for example. A hook may be provided as, for example, in compartment 56 for a mirror. Additionally, a place may be provided on the side of the carrier for an over-the-door rack for hanging clothing and/or a garment bag.

Others of the compartments in the carrier 10 may be utilized for carrying and transporting other items of camping equipment, utensils and/or provisions according to the choice and discretion of the user. Preferably, means are provided to hold all items carried in such a way that in the transport position they do not rattle or bounce around. For example, the compartment 66 may be utilized for carrying provisions such as canned goods and the like. The various compartments may be provided with metal eyes spaced upwardly from the shelves on the three sides with a webbing strip running through the eyes for holding articles in place in their compartments. The webbing strip may be held at the end or ends by means of snap fasteners of types known in the art.

A shelf may be provided on one side of the cupboard, carrier or cabinet having a hinged mounting so that it can fold into position and then collapse into a transport position against the side of the carrier or cabinet.

The carrier is preferably constructed of lightweight but durable material such as aluminum, fibre-glass, plastic, plywood or the like. The carrier provides, therefore, a lightweight but very compact and commodious unit suitable for effectively transporting all the necessary items as described above and for utilizing them when the carrier is in its upright position as described. Those skilled in the art will accordingly observe that the invention achieves and realizes all of the objectives and advantages outlined in the foregoing, as well as the additional advantages which are apparent from the detailed description. In particular, the invention provides most of the conveniences offered by a camp size house trailer without the burden and inconvenience of having to tow such a unit. The carrier can be fabricated and installed relatively inexpensively and its advantages therefore realized without any particular hardship.

The foregoing disclosure is representative of a preferred form of the invention and is to be interpreted in an illustrative rather than a limiting sense, the invention to be accorded the full scope of the claims appended hereto.

What is claimed is:
1. In a carrier for transporting camping equipment in combination, means comprising a container for such equipment, means whereby the container may be transported on top of a vehicle comprising a pair of rails having means for mounting the rails on top of the vehicle, said carrier having roller means whereby it may traverse laterally on the rails, means for securely holding the carrier in position on the rails for transportation, said rails having hairpin bent portions extending laterally outwardly from the top of one side of the vehicle, means whereby the carrier may be tilted into an upright position at one side of the vehicle while being held by the rails, said means including members having engagement on the inside of the rails whereby the upper part of the carrier is held at the extremity of the hairpin bent portions of the rails, and means to provide support underneath the carrier in its upright position.

2. In a carrier for transporting camping equipment, in combination, means comprising a container for such equipment, means whereby the container may be transported on top of a vehicle comprising a pair of rails having means for mounting the rails wholly on top of the vehicle, said carrier having roller means whereby it may traverse laterally on the rails, means for securely holding the carrier in position on the rails for transportation, said rails having hairpin bent portions extending laterally outwardly from the top of one side of the vehicle, said roller means including rollers on opposite sides of the rails for holding the carrier in engagement therewith, means whereby the carrier may be tilted into an upright position at one side of the vehicle being held by the rails, said means including rollers having engagement on the inside of the rails whereby the upper part of the carrier is held at the extremity of the hairpin bent portions of the rails and means to provide support underneath the carrier in its upright position.

References Cited in the file of this patent
UNITED STATES PATENTS

| | | |
|---|---|---|
| 1,317,895 | Rudy | Oct. 7, 1919 |
| 1,659,114 | McDonald | Feb. 14, 1928 |
| 2,354,944 | Clark | Aug. 1, 1944 |
| 2,551,351 | Swenson | May 1, 1951 |
| 2,746,628 | Neyra | May 22, 1956 |
| 2,756,093 | Boger | July 24, 1956 |
| 2,828,035 | Kuchinskie | Mar. 25, 1958 |
| 2,946,397 | Berberich | July 26, 1960 |

FOREIGN PATENTS

| | | |
|---|---|---|
| 644,099 | France | May 26, 1928 |
| 752,497 | Great Britain | July 11, 1956 |